United States Patent Office 3,330,617
Patented July 11, 1967

3,330,617
POLYMERIC FIBERS COLORED WITH
CATIONIC DYESTUFFS
Charles E. Lewis, Somerville, N.J., assignor to American Cyanamid Company, New York, N.Y., a corporation of Maine
No Drawing. Original application Nov. 10, 1961, Ser. No. 151,443. Divided and this application Sept. 27, 1966, Ser. No. 582,217
6 Claims. (Cl. 8—41)

This application is a division of application Ser. No. 151,443 filed Nov. 10, 1961.

This invention relates to a new cationic azo dye, to the dyeing therewith of polymeric fibers having anionic sites and to such fibers dyed therewith. More particularly, this invention is concerned with a new quaternized azo dye salt represented by the formula

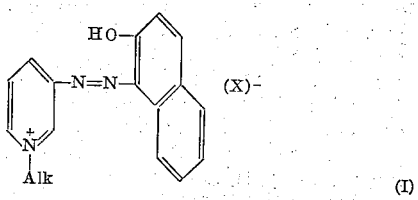

(I)

wherein Alk is methyl or ethyl and $(X)_-$ is an anion corresponding to the colored cation.

Until relatively recent times, commercial interest in azo dyes has been principally concerned with acidic azo dyes, i.e., those which contain sulfonic or carboxylic groups. Such dyes are highly useful for coloring such materials as cellulosic fibers or protein fibers such as wool and silk. They have substantially no affinity for fibers having recurring negative charges, i.e., fibers having anionic sites. In this discussion, for purposes of simplifying reference thereto, they will be referred to as "anionic polymeric" or "AP" fibers.

However, more recently several classes of cationic arylazo dyes have been developed. Whereas the earlier acidic azo dyestuffs exhibit little or no affinity for AP materials, these newer cationic arylazo dyes show strong affinity for such materials. This finding has opened the way for development of better coloring for many synthetic fibers with arylazo-type dyestuffs.

A number of such dyestuffs, highly useful for dyeing AP fibers bright clean shades have been developed. In general, a full line of shades has been made available through use of these dyes, either per se or in suitable blends thereof. Cationic yellow dyestuffs therefore have been available for these purposes prior to the present invention. However, for a number of reasons, none of these yellow dyestuffs has proved wholly satisfactory for commercial development.

For example, a satisfactory dyestuff obviously must be capable of dyeing AP materials the desired clear bright shades of yellow. Few such cationic yellow dyestuffs are known. Moreover, to be wholly satisfactory for commercial development, the dyestuff also must meet a number of additional criteria. Not the least of these is the necessity for producing dyeings of adequate light fastness as measured by AATCC standards. It should also have satisfactory properties, in accordance with other AATCC testing procedures for wash fastness, acid and alkaline perspiration resistance, resistance to acid and alkaline spotting, dry cleaning and chlorine fastness as well as wet pressing and non-crocking properties.

In addition, a good dye must exhibit rapid exhaust rates in dyeing. It should be compatible with other cationic dyes of red, blue or violet shades to produce fine green or brown shades. It also should be compatible with the various diluents, modifiers, buffers or assistants which are normally blended with similar cationic dyes.

Moreover, AP fibers are frequently used in blends with such other fibers as cotton, wool, silk, acetate and the like, as well as with a number of nonanionic polymeric fibers. It is often desirable to pre-dye or post-dye these additional fibers. A wholly satisfactory cationic dye should not produce staining of these non-anionic fibers, whether natural or synthetic.

For various reasons, such cationic yellow dyes as have been previously available have been found deficient in one or more of these essential characteristics. It is, therefore, the principal object of the present invention to provide a yellow cationic dyestuff which is not subject to these deficiencies. This object has been accomplished to a highly successful degree by the provision of the dyestuffs of Formula I above.

An advantage of the present invention is that preparation of the dyestuff of this invention requires no unusual or difficult procedural steps or equipment. According to the present invention, using conventional reaction procedures, it has been found that when 3-aminopyridine is diazotized, coupled to β-naphthol and then quaternized with an alkylating agent, such as a dialkyl sulfate, an alkyl halide and the like, a dye salt is obtained. This dye salt, which has the Formula I above, dyes AP material a bright reddish yellow shade. It exhibits good solubility and dyeing properties. When dyed on polyacrylonitrile fibers, the dyeings have exceptional fastness properties.

Dye salts of the present invention are suitable for and produce good results in the usual dyeing procedures. For example, dyeing may be accomplished using a weakly acidic dye bath, preferably at a temperature of about 190°–205° F. If so desired, however, temperatures up to the boil may be used. Exhaust rates are good. Substantially no staining of non-ionic fibers is observable in pre-dyeing and post-dyeing blends.

Finding the highly successful combination of desired properties in the dyestuff of Formula I is quite unexpected. It is particularly surprising in that dye salts have been previously known which chemically are very closely related.

For example, perhaps the best of the previously-known yellow dyestuff salts of this type is shown in United States Patent No. 2,864,813.. As disclosed therein, it is known in the art to couple 3-aminopyridine to α-naphthol and then quaternize with diethyl sulfate. The resulting cationic azo dye can be represented (in the form of I, above) as

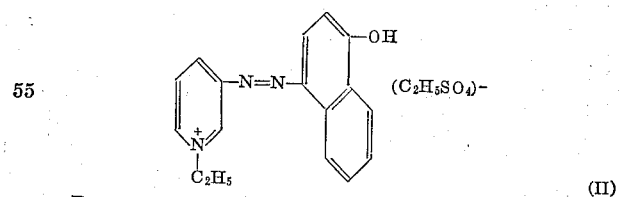

(II)

Dyestuff II, when dyed on polyacrylonitrile fibers, produces dyeings having an excellent yellow shade. Unfortunately, however, the dyeings are exceedingly fugitive to light. The shade breaks badly after about 20 hours exposure in a standard fadeometer test, turning brown very rapidly. In similar tests the dye salts of the present invention show substantially no fading or change even after 320 hours. In dyeing blends, dyestuff II also produces severe staining of acetate and other non-anionic fibers while the dye I of this invention leaves them clean. The exhaust rate for dye I of the present invention is comparable with the better of the previously-known dyes of this type. Dyestuff II exhausts poorly, considerable dye remaining in the test bath, even after an hour. Other salts of II, such as the zinc chloride double salt, have the same deficiencies.

As will be seen by comparing I and II the chemical distinctions are: (a) the presence of an N-ethyl group in II rather than an N-methyl substituent as in I; and (b) coupling on α-naphthol rather than β-naphthol. As shown in the same patent, the N-alkyl substituents may be taken as equivalent. The primary chemical distinction, then, lies in the different naphthol.

It could not be expected from the prior art that such a substitution of coupling components would produce the striking improvements possessed by the dyestuff of the present invention. For example, as disclosed in British Patent No. 789,263, β-naphthol coupled to diazotized 2-aminopyridine and similarly quaternized produces a violet dyestuff which can be represented by the following formula

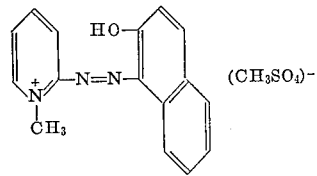

(III)

However, this not only is not a yellow deystuff but it also exhibits a number of other deficiencies which militate against its being commercially developed for general use.

One further distinction between dyestuffs of Formula I as compared with III may be noted. The chromophoric grouping in III comprises a system conjugated with the hetero nitrogen atom. In Formula I it does not. Other dyestuffs known in the prior art have even less closely related structures than do either II or III. Moreover, all are either non-quaternized or have conjugated systems.

That it be a quaternized salt and that it have in the chromophoric grouping a system conjugated with the hetero nitrogen, have both been considered essential characteristics of cationic dyes for AP fibers and other AP materials. Accordingly, obtaining in the non-conjugated dye salts of the present invention a combination of almost every desired quality of compatibility, color, fastness, and freedom from staining is completely unexpected. Whether or not the lack of conjugation produces this result, or if so, why, is not wholly understood.

Dyestuff salts of this invention are generally useful for dyeing fibers composed, at least in part, of anionic polymers, i.e., thermoplastic, linear polymers having negatively charged groups substituted on the polymeric chain. These polymers are well-known in the art. In general, they are prepared either by the copolymerization or homopolymerization of an anionic group-containing-monomer. In some instances, however, they may be produced by the after-treatment of a non-ionic polymer with an agent such as a sulfonating agent. Additionally, the anionic groups which serve as dye sites may be introduced as end groups on a vinyl polymer chain by the use of a suitable polymerization initiator, such as persulfate, or by the use of a suitable chain stopper such as sulfite. In this case it is not necessary to use an anionic monomer. However, prepared, the structure of the anion is immaterial to the utility of the polymer in the present invention.

Among the suitable vinyl polymerizable anionic monomers are: styrene compounds, such as styrene sulfonic acids, styrene phosphonic acids, styrene carboxylic acids as well as the 2-methyl derivatives of these acids; sulfonic, phosphonic and carboxylic acid derivatives of such olefins as ethylene, propylene, isobutylene and the like; and free unsaturated carboxylic acids such as acrylic, methacrylic and itaconic acid.

These anionic monomers can be homopolymerized, or alternatively copolymerized with non-ionic monomers to produce the aforementioned polymers having a sufficient proportion of anionic sites to be dyed with the cationic dyestuff compositions of this invention. Among the non-ionic monomers which can be usefully copolymerized are nitriles such as acrylonitrile and vinylidene dinitrile; unsaturated alcohols such as vinyl alcohol, allyl alcohol, methallyl alcohol, allyloxyethanol and α-hydroxymethylacrylonitrile; halides such as vinyl and vinylidene chlorides and fluorides; olefins such as styrene and butadiene; esterified carboxylic acids such as vinyl acetate, vinyl chloroacetate, vinyl formate, vinyl propionate, allyl chloroacetate, methyl acrylate, methyl methacrylate, methyl α-acetaminoacrylate, methoxyethyl acrylate, methyl α-chloroacrylate, dimethyl fumarate and 3-methylenephthalides; amides such as acrylamide, N-dimethylacrylamide, N-dimethylaminopropylacrylamide and N-(2-hydroxyethyl)acrylamide; and ethers such as vinyl methyl, vinyl ethyl and allyl glycidyl ethers.

The anionic copolymers can also be of the condensation polymer type. Important examples of these are polyamides, polyurethanes, and polyesters. Such polymers are usually formed from polyalcohols and polyamines by condensation with polyacids and polyisocyanates. The anionic groups can be introduced as an anionic substituent present in one of the reactants. For example, in the preparation of poly(ethylene terephthalate), incorporation of a small amount of sulfoterephthalic acid results in the formation of a polymer containing sulfonic acid substituents. Alternatively, as noted above, non-ionic condensation polymers can be rendered anionic by suitable after-treatment, e.g., sulfonation.

While the dyestuffs of the present invention can be used to dye polymers having even a small number of anionic sites recurring throughout the polymeric chain, for practical purposes the fibers should be composed of polymers in which the anionic groups are present to the extent of at least 10 millimoles per kilogram of polymer and preferably in the range of from about 25 to 100 millimoles per kilogram. Even higher concentrations may be present, but are not necessary.

Many examples of the aforementioned anionic polymers are commercially available. Typical illustrative products include the following:

(1) acrylonitrile - methylmetharcylate copolymers having terminal anionic groups introduced by the polymerization catalyst and/or chain-stopper;
(2) acrylonitrile - methylvinylpyridine - vinyl acetate terpolymers with anionic end groups;
(3) acrylonitrile-styrene sulfonic acid copolymers (cf. U.S. Patent 2,837,500);
(4) acrylonitrile - methyl methacrylate - styrenesulfonic acid terpolymers (cf. U.S. Patent 2,837,501);
(5) acrylonitrile - vinylidene chloride - polyvinyl - pyrolidine terpolymers with anionic end groups;
(6) acrylonitrile-vinyl chloride copolymers with anionic end groups;
(7) vinylidene dinitrile-vinyl acetate copolymers with anionic end groups; and
(8) ethylene glycol, terephthalic acid or dimethyl terephthalate and sulfoterephthalic acid condensation polymers.

The invention will be further discussed in conjunction with the following examples which are intended as illustrative only. Therein, unless otherwise noted, all parts and percentages are by weight and temperatures are expressed in degrees Fahrenheit.

EXAMPLE 1

*Preparation of 3-(2-hydroxy-1-naphthylazo)-pyridine*

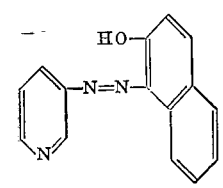

To a cold solution of 35 parts of 3-aminopyridine in 29.8 parts by volume of 20% hydrochloric acid and 28 parts of water, is slowly added 37.2 parts by volume of normal sodium nitrite solution. When diazotization is completed, 53 parts of β-naphthol, 28 parts by volume of 20% hydrochloric acid and 28 parts of water are added, followed by 93 parts by volume of 20% sodium carbonate solution. An aqueous solution of 20% sodium hydroxide is added as needed to keep the pH about 8. When coupling is completed, the product is collected and air-dried. It is then recrystallized from isopropyl alcohol, collected and again dried.

EXAMPLE 2

*Preparation of 1-methyl-3-(2-hydroxy-1-naphthylazo)- pyridinium methyl sulfate*

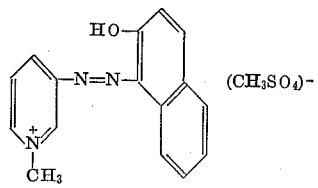

To a solution of 52 parts of 3-(2-hydroxy-1-naphthylazo)- pyridine prepared as in Example 1, dissolved in 700 parts of toluene, is added 20 parts of dimethyl sulfate. The mixture is stirred without temperature control until quaternization is complete. The product is collected, washed with toluene and dried. It is recrystallized from alcohol, collected and dried. The melting point is above 300° C.

EXAMPLE 3

*Preparation of 1-ethyl-3-(2-hydroxy-1-naphthylazo)- pyridinium ethyl sulfate*

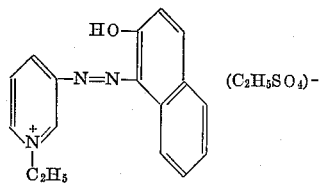

Example 2 is repeated, substituting for the dimethyl sulfate an equivalent amount of diethyl sulfate. Product crystals of substantially the same appearance are produced.

EXAMPLE 4

Test five-gram skeins of a commercially-avalable polyacrylonitrile fiber yarn composed of 94% of acrylonitrile and 6% methyl acrylate are prepared by attaching thereto small bundles of cotton, wool, acetate and a polyester fiber commercially available as Dacron 54. Test solutions (0.5% shade) of the dyestuffs of Example 2, Example 3 and of Formula II are prepared by mixing:

25 mg. of the dyestuff
2 ml. of a 5% solution of 28% acetic acid
200 ml. of water Pre-wetted test skeins are entered into the test dyebaths and the temperature raised to about 200° F. Dyeing is carried out at 200° F. for sixty minutes. The skeins are then removed, rinsed with water, scoured at 140° F. for five minutes in an 0.1% neutral soap solution, again rinsed and finally dried. The skeins are dyed a bright reddish-yellow shade of good color value by the dyestuffs of Examples 2 and 3 and a bright greenish-yellow shade by the dyestuff of Formula II.

Exhaust of dyestuffs of Example 2 and 3 proceeds at good rates, to substantially completion. The rate for the dye of Formula II is slower and the residue in the dyebath is very appreciable.

Test samples of dye fibers are subjected to the AATCC light fastness test and rated (AATCC Yearbook, 1957). The dyeings of the present invention showed little fading at 320 hours. The light fastness ratings are 6–7. The samples using the dye of Formula II break badly after about 20 hours and turn orange-brown. No rating can be made.

Test dyeings of fibers dyed with the dyestuffs of Examples 2 and 3 are subjected to additional fastness tests (AATCC Yearbook, 1957) with the following results.

| Test: | Rating |
|---|---|
| Fade-Ometer | 6–7 |
| Crocking | 5 |
| Dry cleaning | 5 |
| Wet pressing, color transfer | 5 |
| Wash No. 3, hue | 4–5 |
| Wash No. 3, strength | 5 |
| Acid perspiration, hue | 4–5 |
| Acid perspiration, strength | 5 |
| Alkaline perspiration, hue | 4–5 |
| Alkaline perspiration, strength | 5 |

In the quaternized salts of the present invention, the color is determined by the cation. In general the specific anion is not critical. It may be quite widely varied. However, the salts of strong acids are generally more soluble in water. Accordingly, $(X)^-$ is usually a chloride, bromide, iodide, sulfate or bisulfate ion; an organic sulfate ion such as methosulfate, or a benzene, halobenzene or alkylbenzene sulfonate. Soluble combinations of the dye salt and an inorganic metal salt, such as the zinc chloride double salt are also found useful. They are readily prepared and used in the same manner as for other cationic dyes.

I claim:
1. Polymeric fibers having anionic sites colored with a dyestuff of the formula

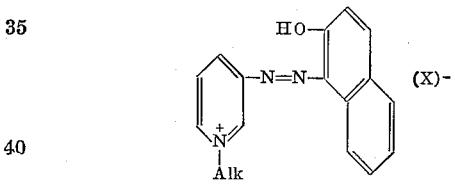

where $(X)^-$ is an anion of a water-soluble quaternizing salt and Alk is selected from the group consisting of methyl and ethyl.
2. A colored fiber as defined in claim 1 where Alk is methyl.
3. A colored fiber as defined in claim 2 where $(X)^-$ is $(CH_3SO_4)^-$.
4. An acrylonitrile polymer colored with a dyestuff of the formula

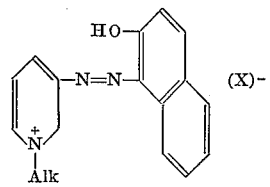

where $(X)^-$ is an anion of a water-soluble quaternizing salt and Alk is selected from the group consisting of methyl and ethyl.
5. A colored polymer as defined in claim 4 wherein Alk is methyl.
6. A colored polymer as defined in claim 5 wherein $(X)^-$ is $(CH_3SO_4)^-$.

References Cited

UNITED STATES PATENTS 2,864,813  12/1958  Bossard et al. _____ 8—55 X

FOREIGN PATENTS 789,263  1/1958  Great Britain.

NORMAN G. TORCHIN, *Primary Examiner.*

J. HERBERT, *Assistant Examiner.*